Dec. 6, 1927.

A. W. CAPS 1,651,441

ROLL HOLDING CAMERA

Filed April 13, 1927     2 Sheets-Sheet 1

INVENTOR
Arthur W. Caps
BY
his ATTORNEYS

Dec. 6, 1927.

A. W. CAPS 1,651,441

ROLL HOLDING CAMERA

Filed April 13, 1927     2 Sheets-Sheet 2

INVENTOR
Arthur W. Caps
BY
his ATTORNEYS

Patented Dec. 6, 1927.

1,651,441

UNITED STATES PATENT OFFICE.

ARTHUR W. CAPS, OF ROCHESTER, NEW YORK, ASSIGNOR TO PHOTOSTAT CORPORATION, OF PROVIDENCE, RHODE ISLAND, A CORPORATION OF RHODE ISLAND.

ROLL-HOLDING CAMERA.

Application filed April 13, 1927. Serial No. 183,288.

My present invention relates to photography, and more particularly to photographic roll holding cameras, and it has for its object to provide an improved arrangement between and construction of the roll holder and exposing chambers of the camera. The improvements are directed in part to masking means for controlling the size and shape of the exposure opening in the exposure chamber of the camera, and to an adjustable arrangement of the supply roll of sensitive material, whereby the latter may be fed through or past the exposure opening in a manner suited to the particular size and shape of that opening. The improvements are further directed to the provision of a convenient arrangement of identifying and indicating means, through the use of which the feed roll may be quickly and accurately adjusted with relation to the particular mask or exposure opening with which the camera chamber is provided.

To these and other ends the invention resides in certain improvements and combinations of parts all as will be hereinafter more fully described, the novel features being pointed out in the claims at the end of the specification.

In the drawings.

Similar reference numerals throughout the several views indicate the same parts.

Figure 1:
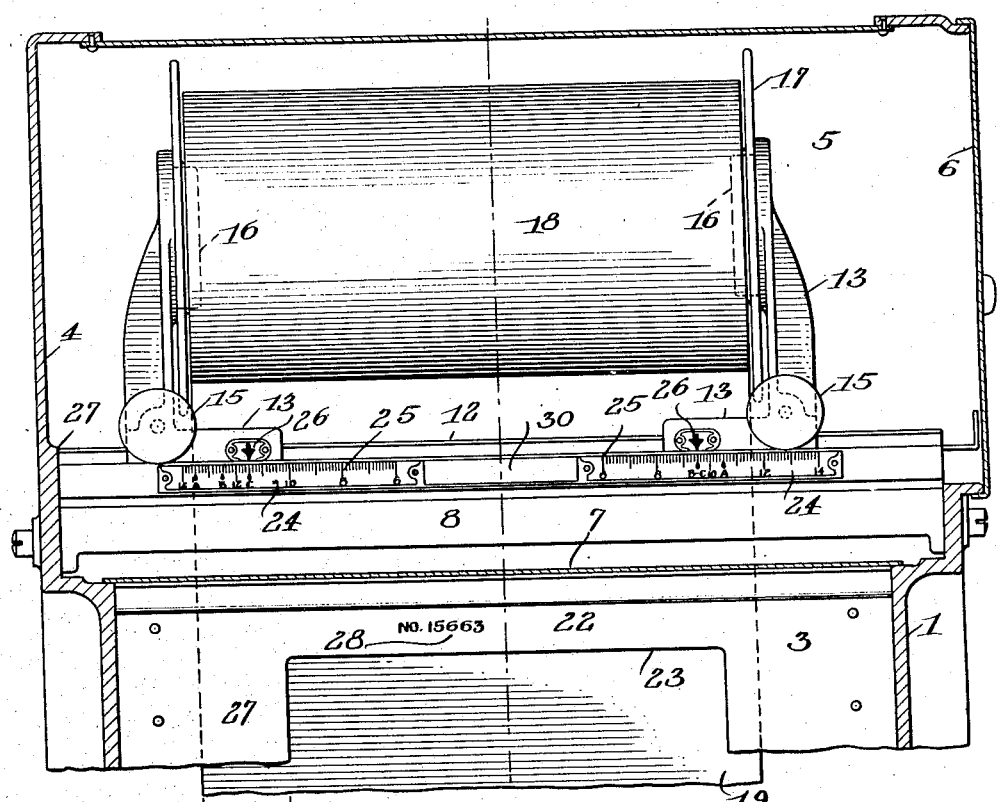
Figure 1 is a fragmentary vertical section through the roll holding and exposing chambers of a camera constructed in accordance with, and illustrating one embodiment of my invention, the section being taken in a plane just in rear of the focal plane of the camera.

My present invention is particularly adaptable to commercial or copying cameras of the type now in general use for making photographic copies of documents, in which type of camera a continuous strip or sheet of sensitized paper is drawn from a roll holder into the focal plane of the camera, a photograph made directly thereon, and then the picture area severed and developed. I have illustrated the necessary parts of such a camera in the accompanying drawing, referring more particularly to which 1 indicates a camera body or casing enclosing a dark chamber or exposure chamber 3. An upper continuation 4 of the casing frame forms a roll holding chamber 5 accessible through a relatively large door 6 at one end. This roll holding chamber 5 is directly above the exposure chamber and communicates therewith through a suitable opening adapted to accommodate the passage of the paper strip or sheet in a wall 7 that separates the two chambers.

Figure 6:
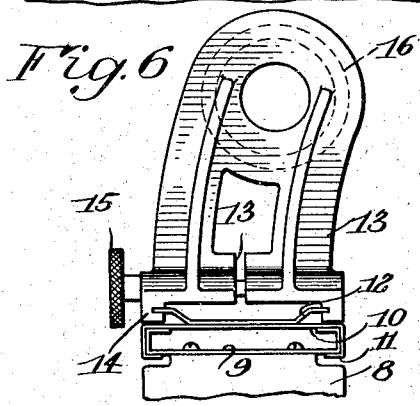
Figure 6 is an end view of one of the spool supports of the roll holder.

The floor of the roll holding chamber indicated at 8 is provided with a suitable track 9 shown in end view in Figure 6. Slidable on this track and removable therefrom through the end door 6 is a carriage 10 having flanges 11 engaging beneath the track and itself provided on top with a track 12 removable with it. Slidably adjustable on this track 12 is a pair of spool supports 13. These consist in the present instance each of a bracket split at 13 forming two spring parts carrying gibs 14 that directly engage the track 12 and may be pinched together to lock with it, and hold the support in a fixed position by means of a screw 15. The upper end of each bracket carries a lug or trunnion 16 that engages in and forms a journal for one end of a paper holding spool or cartridge 17, 17 showing the flanges of the spool and 18 the roll of photographic paper carried thereby.

Figure 4:
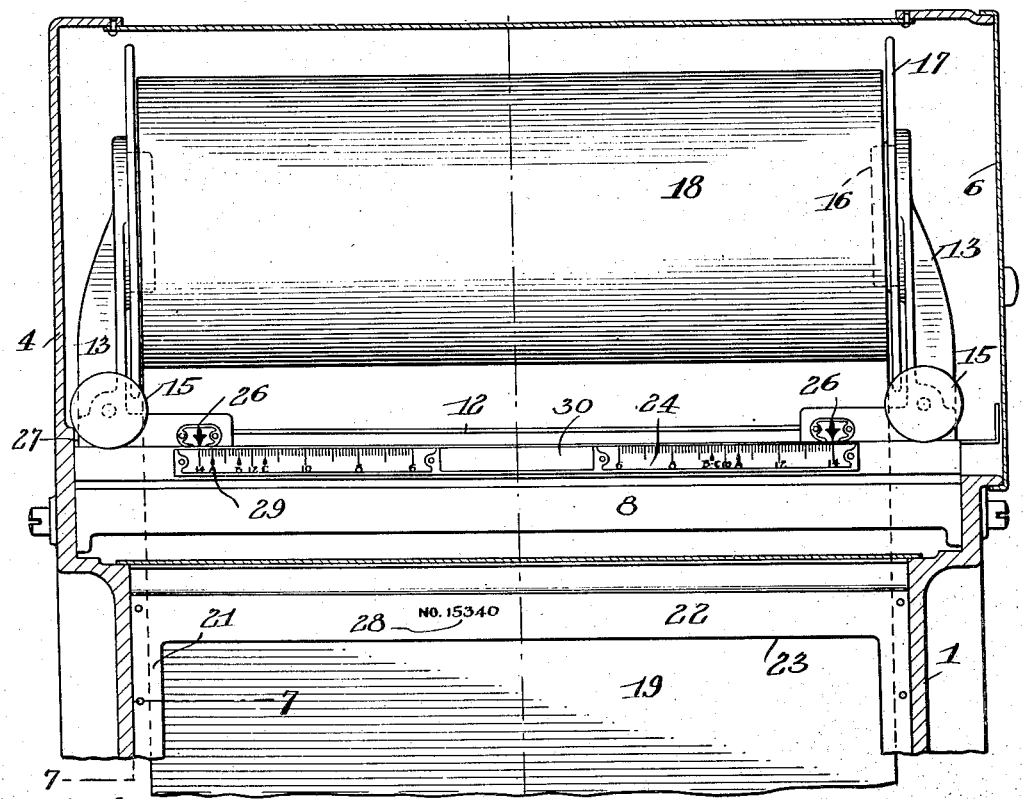
Figure 4 is a view similar to Figure 1 showing still another form of mask in connection with a film roll also of a different size from that shown in Figure 1.

With this construction it will be seen that the roll holder may be conveniently loaded by withdrawing the whole carriage 10 with all of its super-structure; slidably adjusting the end supports 13 toward or from each other to properly engage a spool at a given length; tightening the screws 15 to fix the brackets solidly in position and then sliding the carriage back into the roll holding chamber on the track 9. In Figure 4 is shown in operative position a spool longer than that shown in Figure 1.

Figure 2:
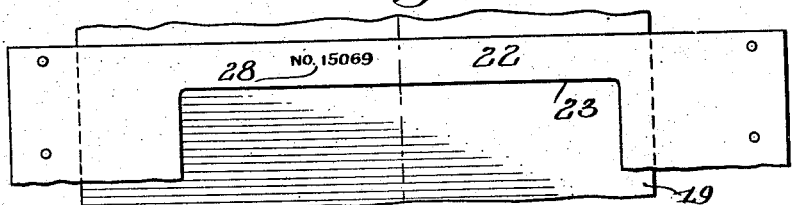
Figure 2 is a fragmentary rear elevation of a mask defining the exposure opening, but of a character different from that shown in Figure 1.
Figure 3:
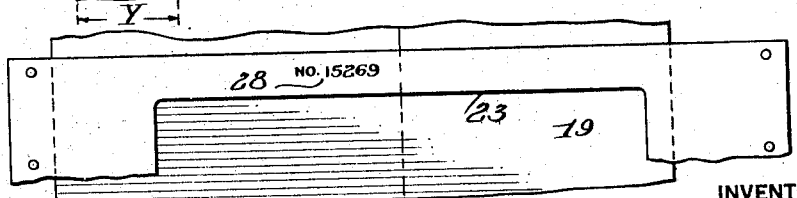
Figure 3 is a similar view of still another form of mask.
Figure 7:
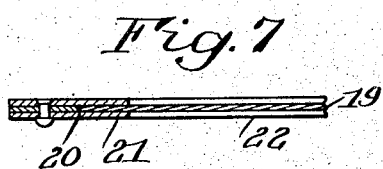
Figure 7 is an enlarged fragmentary detail section taken on the line 7—7 of Figure 4.

The paper strip 19 is drawn from the roll 18 down into the exposing position in the focal plane as previously described. It passes through and is held at its edges by a guiding groove indicated at 20 in Figure 7, which groove is formed by the separated edges of the two-part sheet metal rails 21 of a mask 22 located in the focal plane and having an exposure opening 23 that defines the area to be exposed by the light from the camera lens (not shown). Several masks of different form and size are shown in Figures 1, 2, 3 and 4 and these masks are interchangeable, being removable and replaceable within the camera body. They differ in size and in width of exposure opening to suit the different widths of paper and they may also differ in width of exposure opening to enlarge or reduce the exposure area or to provide at one side of the exposed sheet an unexposed or masked off margin for binding purposes when the prints are to be secured together in a book. For instance, paper of different widths is shown in Figures 1, 2 and 3 with wide binding margins indicated at X, Y and Z at the left side of each masking frame. In Figure 4 there is shown a much larger sheet with a much wider exposure opening, and no binding edge provided for.

To correlate for these purposes the feeding path of the paper from the roll holder with its different widths, and to sometimes feed it on the central line of the exposure opening in the mask, and sometimes offset therefrom as respectively shown in Figures 4 and 1, is one of the functions of the adjustable spool holders 13 and their mountings, a perfect range of adjustment being provided for. However, inasmuch as the film or paper roll 18 is preferably applied and adjustable while its supports are removed from the roll holding chamber as before described, it is desirable to have means for guiding the operator in properly positioning the spool as a whole on its carriage 10 while out of the camera. I provide such means in the present instance in the form of a double scale 24 marked off at 25 in inches or other units of measurement for each end support 13. Each supporting bracket 13 for this purpose is provided with an indicator 26 cooperating with the scale 24. In this way the spool end supports or centers may be fixed in position accurately relatively to each other in accordance with the spool length and may be together positioned and secured with the spool in place with reference to the particular mask that it is intended to use. As the carriage 10 itself when slid into the chamber always occupies the same position because, in the present instance, of its end abutting the end wall of the chamber as shown at 27 in Figure 1, a definite relationship is established for feeding the paper properly into the particular mask.

Figure 5:
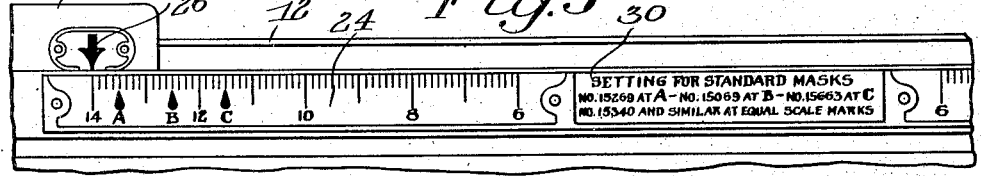
Figure 5 is an enlarged fragmentary view of the roll holder scale.

Each mask is preferably provided with an identifying character or inscription, as shown by the numbers indicated at 28 in the figures. As a quicker means of adjusting the spool holder for a particular mask, I prefer to provide additional indicia 29 on the scale plates. These indicia correspond to the characters 28 on the masks indicating their equivalent, and in the present instance consist of the letters A, B and C. The letters are used because they take up less room than the numbers on the scale plate, but at a convenient point on the latter a key or chart 30 is given bearing the translation of the two sets of characters, one into the other. Referring to Figure 5, mask number 15,663 is equivalent to C on the scale and the roll holder is shown at that setting in Figure 1 with respect to both roll supports with mask number 15,663 in use.

Through the use of my invention a roll holder of this character is easily loaded and adjusted outside of the camera, where it is easy to manipulate in spite of the variables enumerated producing prints of different sizes in different positions on the sheet.

I claim as my invention:

1. In a photographic apparatus, the combination with a camera embodying an exposure chamber and a mask therein defining an exposure aperture of a given size, of a roll holding chamber associated with the exposure chamber, a roll holder in the roll holding chamber adjustable longitudinally of its own axis and in parallelism to the plane of the mask, the roll holding chamber and the mask being respectively provided with corresponding indicia as a guide to establishing certain desired positions of the roll holder with reference to the mask.

2. In a photographic apparatus, the combination with a camera embodying an exposure chamber and a plurality of interchangeable masks of different form adapted to fit therein and to define exposure apertures of different sizes, of a roll holding chamber associated with the exposure chamber, a roll holder in the roll holding chamber adjustable longitudinally of its own axis and in parallelism to the plane of the mask position, the respective masks being provided with indicia and the roll holding chamber being provided with corresponding indicia as a guide to establishing certain desired positions of the roll holder with reference to the individual masks.

3. In a photographic apparatus, the combination with a camera embodying an exposure chamber and a plurality of interchangeable masks of different form adapted to fit therein and to define exposure apertures of different sizes, of a roll holding chamber associated with the exposure chamber, a roll holder in the roll holding chamber adjustable longitudinally of its own axis and in parallelism to the plane of the mask position, the respective masks being provided with indicia and the roll holding chamber being provided with a scale having corresponding indicia as a guide to establishing certain desired positions of the roll holder with reference to the individual masks, said scale being further provided with a key bearing translations of the indicia on the masks into terms of smaller indicia on the scale.

4. In a photographic apparatus, the combination with a camera embodying an exposure chamber and a mask therein defining an exposure aperture of a given size, of a roll holding chamber associated with the exposure chamber, a removable carriage therein, a roll holder on the carriage adjustable relatively thereto longitudinally of its own axis and in parallelism to the plane of the mask, the carriage and the mask being respectively provided with corresponding indicia as a guide to establishing certain desired positions of the roll holder with reference to the mask.

ARTHUR W. CAPS.